(12) United States Patent
Oleson et al.

(10) Patent No.: US 10,297,164 B2
(45) Date of Patent: May 21, 2019

(54) SYSTEM AND METHOD FOR MONITORING HIKING

(71) Applicant: Under Armour, Inc., Baltimore, MD (US)

(72) Inventors: Mark Oleson, Baltimore, MD (US); F. Grant Kovach, Baltimore, MD (US); Nathan Dau, Baltimore, MD (US); Angela Nelligan, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 73 days.

(21) Appl. No.: 15/211,289

(22) Filed: Jul. 15, 2016

(65) Prior Publication Data

US 2018/0015326 A1    Jan. 18, 2018

(51) Int. Cl.
| | |
|---|---|
| A63B 24/00 | (2006.01) |
| A43B 3/00 | (2006.01) |
| G09B 5/02 | (2006.01) |
| A43B 5/00 | (2006.01) |
| A63B 69/00 | (2006.01) |
| G09B 19/00 | (2006.01) |

(52) U.S. Cl.
CPC .............. *G09B 5/02* (2013.01); *A43B 3/0005* (2013.01); *A43B 5/002* (2013.01); *G09B 19/0038* (2013.01)

(58) Field of Classification Search
CPC ......... A43B 3/0005; A43B 5/00; A43B 5/002; A63B 2220/30; A63B 2225/50; A63B 21/06; A63B 21/0724; A63B 2220/12; A63B 2220/20; A63B 2220/56; A63B 2220/72; A63B 2220/73; A63B 2220/805; A63B 2220/833; A63B 2220/836; A63B 2220/08
USPC .................... 702/141, 142, 160, 149; 700/91
See application file for complete search history.

(56) References Cited

U.S. PATENT DOCUMENTS

| | | | |
|---|---|---|---|
| 2009/0043531 A1* | 2/2009 | Kahn ................... | A61B 5/1038 702/149 |
| 2013/0178958 A1* | 7/2013 | Kulach .............. | A63B 24/0021 700/91 |
| 2016/0357240 A1* | 12/2016 | Oleson ................... | G06F 1/163 |

* cited by examiner

*Primary Examiner* — John H Le
(74) *Attorney, Agent, or Firm* — Maginot, Moore & Beck LLP

(57) ABSTRACT

A system includes a shoe and a pod. The pod is disposed at the shoe and includes a positioning component and an altimeter. The positioning component determines a first geodetic location of the shoe at a first time, whereas the altimeter determines a first elevation of the shoe at the first time. The first positioning component additionally determines a second geodetic location of the shoe at a second time and generate shoe distance data based on the first geodetic location and the second geodetic location. The altimeter additionally determines a second elevation of the shoe at the second time. The positioning component additionally determines a total distance traveled based on the shoe distance data, the first elevation and the second elevation.

17 Claims, 4 Drawing Sheets

SYSTEM AND METHOD FOR MONITORING HIKING

BACKGROUND

The present invention generally relates to monitoring activity while hiking.

There exists a need for a device and method to monitor and view a hiker's activity during, and after, a hike.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Overview

Figure 1:
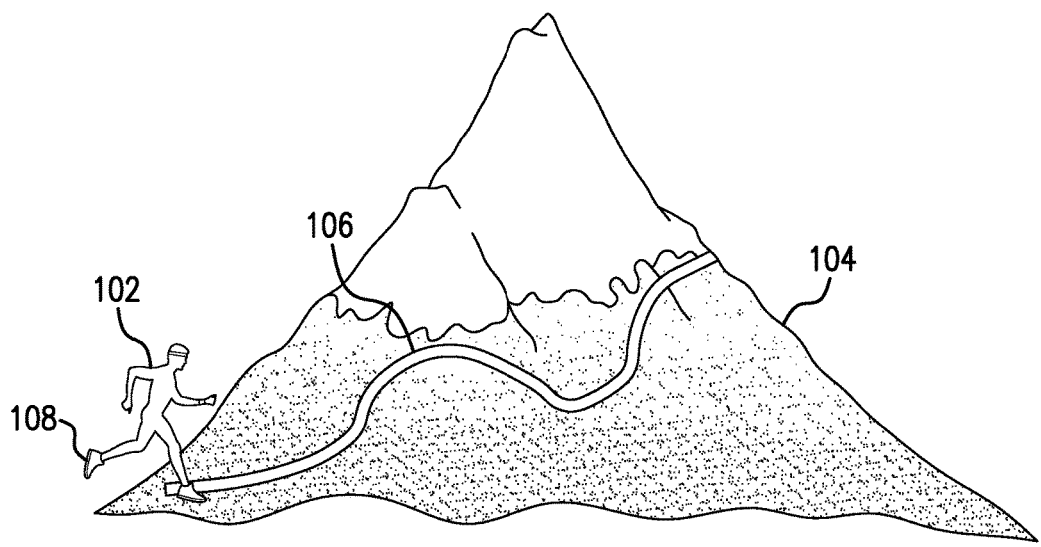
FIG. 1 illustrates a hiker beginning a hike while wearing an activity tracking shoe.

A system includes a shoe and a pod. The pod is disposed at the shoe and includes a positioning component and an altimeter. The positioning component determines a first geodetic location of the shoe at a first time, whereas the altimeter determines a first elevation of the shoe at the first time. The positioning component additionally determines a second geodetic location of the shoe at a second time and generates shoe distance data based on the first geodetic location and the second geodetic location. The altimeter additionally determines a second elevation of the shoe at the second time. The positioning component additionally determines a total distance traveled based on the shoe distance data, the first elevation and the second elevation.

Example Embodiments

One of the recent trends in fitness is using a wearable device to record data related to the activity a user is performing. The data can be downloaded directly to a receiving device, which can be a computer, smartphone or other smart device, and the user can refer to the downloaded data to track his progress. A conventional wearable device may incorporate various sensors to determine activity levels. Non-limiting examples of such sensors include temperature sensors, pressure sensors, water sensors, moisture sensors, saline sensors, electric field sensors, current sensors, voltage sensors, impedance sensors, magnetic field sensors, accelerometers, altimeters, GPS sensors, magnetometers, optical sensors and chemical sensors.

Traditionally, fitness activity is presumed to include activities like running, biking, lifting weights or swimming. However, more recently individuals have begun hiking as a fitness activity. Hiking can require a high level of fitness based on the terrain one chooses, and it may be important for the hiker to track his activity while hiking just as if he were performing more traditional fitness activities.

In addition, hiking presents a unique challenge when a hiker is attempting to hike to a specific location using traditional navigation techniques. One of those techniques, called dead reckoning, relies on a hiker traveling in a specific direction, at a specific speed, from a known location. Knowing his speed, direction and previous location, the hiker should be able to arrive at the desired location. However, the dead reckoning method requires the hiker to move in a straight line over rugged, winding terrain at a constant speed, which is very difficult to do. If the terrain forces a hiker to change directions, slow down while ascending a hill or traversing a difficult area, or speed up to descend a hill, the dead reckoning method may provide an inaccurate prediction of the destination. There exists a need for footwear that can track hiking activity, including a hiker's geodetic location, and display that activity to a hiker.

The present invention provides hiking footwear that includes an activity tracking pod in the sole. The activity tracking pod tracks data related to a hiker's activity, non-limiting examples of such data include geodetic location, hiking speed, distance traveled, altitude, hiking time, foot force, heart rate, blood pressure and perspiration. The activity pod can then provide the hiking data to a device on which the hiker can view data related to hike or compare data to previous hikes. The hiker can also view his location to aid in navigation.

FIG. 1 illustrates a hiker beginning a hike while wearing an activity tracking shoe.

As shown in the figure, a hiker 102 is about to start hiking on a path 106 located on a mountain 104. Hiker 102 is wearing a shoe 108.

Path 106 is a winding path that takes hiker 102 along various terrains and altitudes on mountain 104. The terrain along path 106 may include various sections that are hard, soft, wet, dry, rocky, smooth or any other type of terrain one would typically find along a hiking path.

Shoe 108 is an activity tracking shoe that can track the activity of hiker 102 and communicate with another device to transmit the activity data. Shoe 108 may refer to a single shoe with activity tracking capabilities, but it may also refer to a pair of shoes with each shoe having activity tracking capabilities. Shoe 108 will be further described with reference to FIGS. 2-3.

Figure 2:
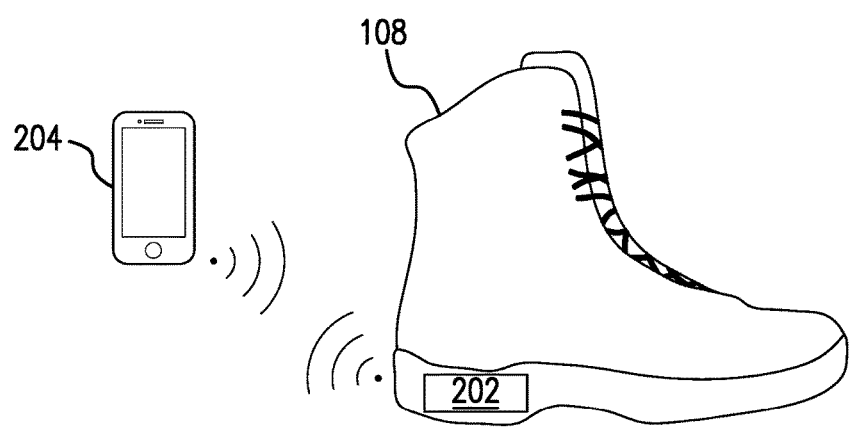
FIG. 2 illustrates communication between an activity tracking shoe and a mobile device.

FIG. 2 illustrates communication between an activity tracking shoe and a mobile device.

As shown in the figure, shoe 108 includes a pod 202. Pod 202 communicates wirelessly with a mobile device 204.

Pod 202 may be any type of device or system that detects a parameter associated with the activity of a hiker. Non-limiting examples of parameter detectors include accelerometers, magnetometers, temperature sensors, pressure sensors, altimeters, light sensors, gyroscopes, global positioning systems, force sensors and moisture sensors.

Mobile device 204 may be a cellular phone, a tablet computer, a laptop computer or any other device capable of receiving and sending information.

Pod 202 and mobile device 204 may communicate by any wireless means that can transmit data from pod 202 to mobile device 204. Non-limiting examples of wireless means include Wi-Fi, Bluetooth, near field communication (NFC), one or more cellular networks, or satellite.

Figure 3:
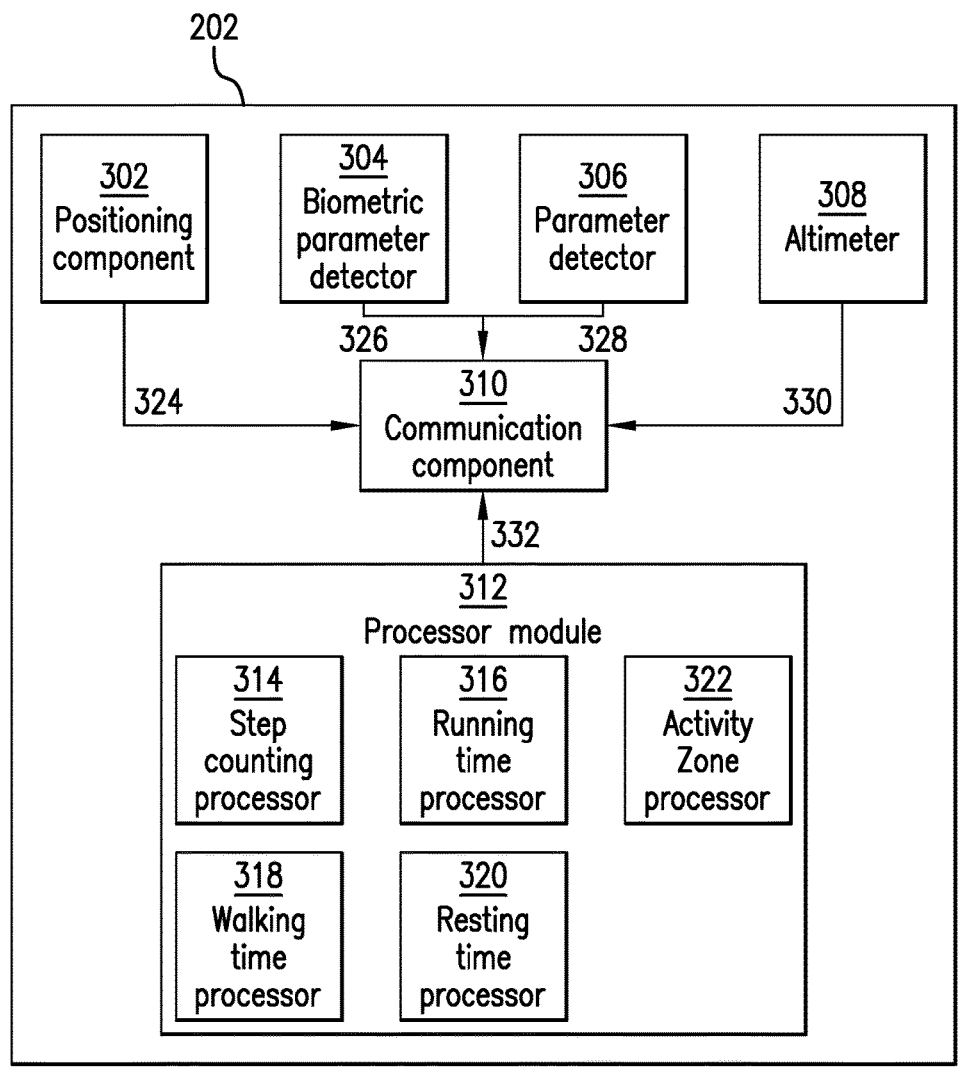
FIG. 3 illustrates a block diagram of an activity tracking pod.

FIG. 3 illustrates a block diagram of an activity tracking pod.

As shown in the figure, pod 202 includes a positioning component 302, a biometric parameter detector 304, a parameter detector 306, an altimeter 308, a communication component 310 and a processor module 312.

In this example embodiment, positioning component 302, biometric parameter detector 304, parameter detector 306, altimeter 308, communication component 310 and processor module 312 are shown as independent components. However, in some embodiments, at least two of positioning component 302, biometric parameter detector 304, parameter detector 306, altimeter 308, communication component 310 and processor module 312 may be combined as a unitary device. Further, in some embodiments, at least one of communication component 310 and processor module 312 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Positioning component 302 communicates with communication component 310 via a communication channel 324.

Positioning component 302 may be any type of device or system that detects the geodetic location of pod 202. A non-limiting example of a geodetic location detector is a global positioning system (GPS).

Biometric parameter detector 304 communicates with communication component 310 via a communication channel 326.

Biometric parameter detector 304 may be any type of device or system that detects biometric parameters of a hiker. Non-limiting examples of biometric parameter detectors include heart rate monitors, blood pressure monitors, perspiration detectors, thermometers and thermocouples.

Parameter detector 306 communicates with communication component 310 via a communication channel 328.

Parameter detector 306 may be any type of device or system that detects one or more position parameters of pod 202. Non-limiting examples of position parameters include speed, velocity, acceleration, jerk, number of steps, foot strike force and time. Non-limiting examples of position parameter detectors include accelerometers, gyroscopes, force sensors and timers.

Altimeter 308 communicates with communication component 310 via a communication channel 330.

Altimeter 308 may be any type of device or system that detects the altitude or elevation of pod 202. Non-limiting examples of altimeters include pressure altimeters, sonic altimeters and radar altimeters.

Processor module 312 communicates with communication component 310 via a communication channel 332.

Processor module 312 further includes a step count processor 314, a running time processor 316, a walking time processor 318, a resting time processor 320 and an activity zone processor 322.

In this example embodiment, step count processor 314, running time processor 316, walking time processor 318, resting time processor 320 and activity zone processor 322 are shown as independent components. However, in some embodiments, at least two of step count processor 314, running time processor 316, walking time processor 318, resting time processor 320 and activity zone processor 322 may be combined as a unitary device. Further, in some embodiments, at least one of step count processor 314, running time processor 316, walking time processor 318, resting time processor 320 and activity zone processor 322 may be implemented as a computer having tangible computer-readable media for carrying or having computer-executable instructions or data structures stored thereon.

Step count processor 314 may be any type of device or system that counts the number of steps a hiker takes based on the parameters detected by at least one of positioning component 302, biometric parameter detector 304, parameter detector 306 and altimeter 308.

Running time processor 316 may be any type of device or system that is able to determine the amount of time a hiker is running based on the parameters detected by at least one of positioning component 302, biometric parameter detector 304, parameter detector 306 and altimeter 308.

Walking time processor 318 may be any type of device or system that is able to determine the amount of time a hiker is walking based on the parameters detected by at least one of positioning component 302, biometric parameter detector 304, parameter detector 306 and altimeter 308.

Resting time processor 320 may be any type of device or system that is able to determine the amount of time a hiker is resting based on the parameters detected by at least one of positioning component 302, biometric parameter detector 304, parameter detector 306 and altimeter 308.

Activity zone processor 322 may be any type of device or system that is able to generate activity zone data based on the running time determined by running time processor 316, the walking time determined by walking time processor 318, the resting time determined by resting time processor 320 and combinations thereof.

An activity zone is a predetermined range of activity levels, and a user will attempt to increase or decrease his activity during a workout or a hike such that his activity levels fall with the predetermined activity zone.

Communication component 310 may be any type of device or system that collects data from various sources and provides the data to another device or system to display the data to a user.

The operation of pod 202 will be further described with reference to FIG. 5.

Figure 4:
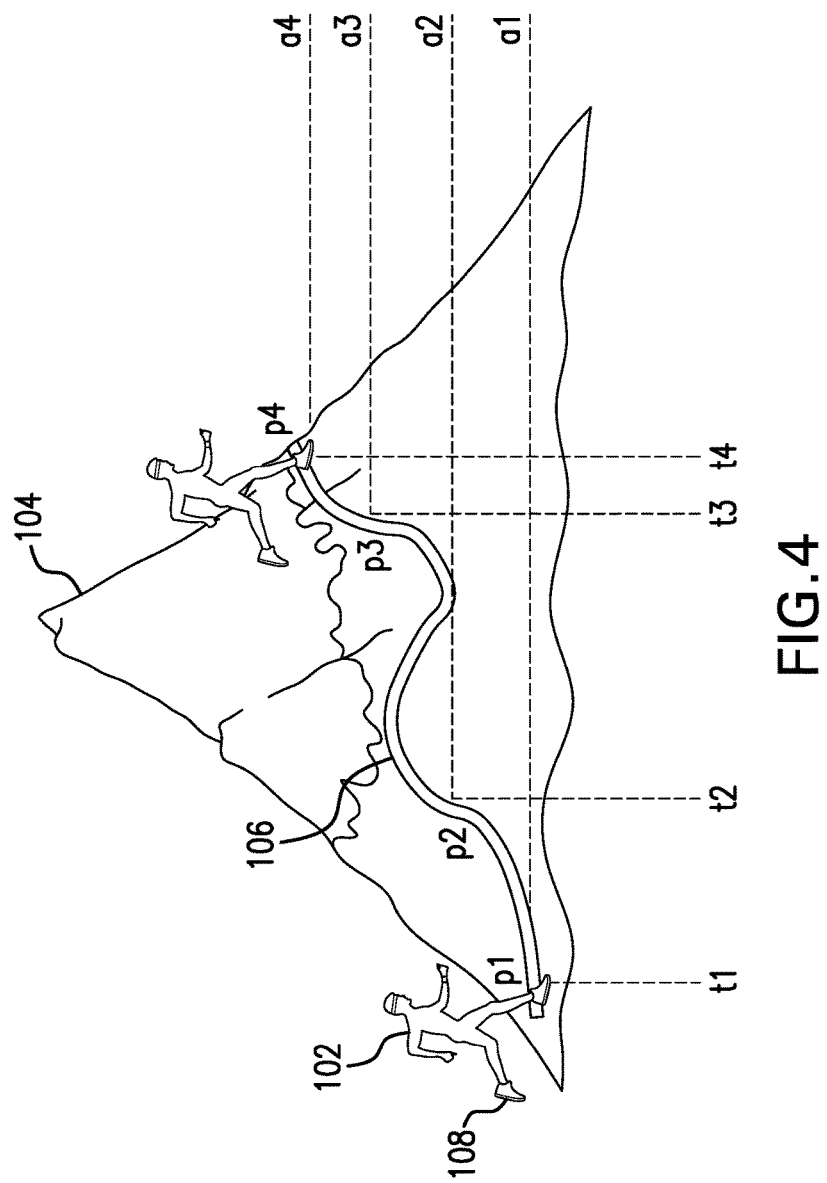
FIG. 4 illustrates a hiker along a full hiking route while wearing an activity tracking shoe.

FIG. 4 illustrates a hiker along a full hiking route while wearing an activity tracking shoe.

As shown in the figure, hiker 102 is at position $p_1$ and altitude $a_1$ at time $t_1$, and hiker 102 is at position $p_4$ and altitude $a_4$ at a later time $t_4$. To move from position $p_1$ and altitude $a_1$ at time $t_1$ to position $p_4$ and altitude $a_4$ at a later time $t_4$, hiker 102 passes by position $p_2$ and altitude $a_2$ at time $t_2$ and position $p_3$ and altitude $a_3$ at time $t_3$.

In this example, hiker 102 may be starting a hike along path 106, and he wishes to track his activity levels throughout the hike. The process by which hiker 102 tracks his activity will be further described with reference to FIG. 5.

Figure 5:
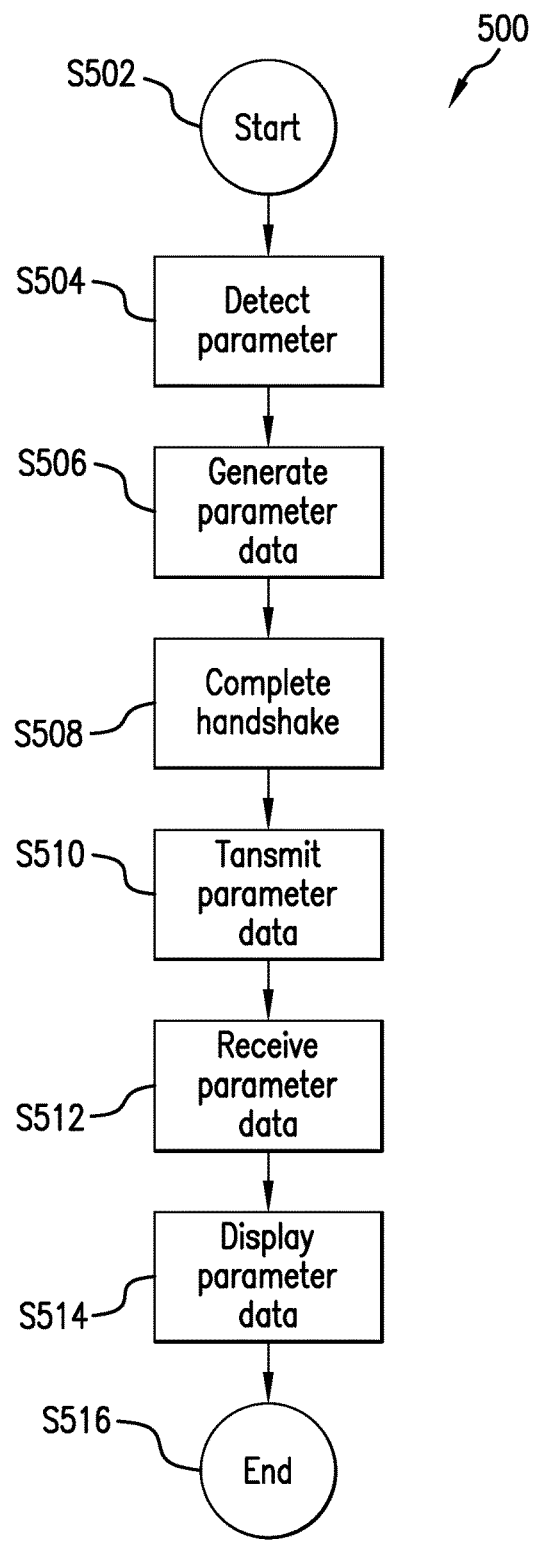
FIG. 5 illustrates a method by which hiking activity data is detected, transmitted and displayed.

FIG. 5 illustrates a method by which hiking activity data is detected, transmitted, and displayed.

As shown in the figure, method 500 starts (S502) and parameters are detected (S504).

Returning to FIG. 4, hiker 102 wishes to track his activity throughout his hike, so he makes sure pod 202 in shoe 108 is activated so it can record data related to the hike. In one embodiment, hiker 102 activates pod 202 by pressing a button located on shoe 108. In another embodiment, pod 202 is activated when hiker 102 inserts his foot into shoe 108 and applies a force to pod 202. In this example embodiment, hiker 102 may wish to track his distance traveled, altitude change, pulse rate and hiking speed.

Referring now to FIG. 3, as hiker 102 begins his hike at time $t_1$, positioning component 302 may record that the starting position of hiker 102 is $p_1$, and positioning component 302 may record the geodetic location of $p_1$. Altimeter 308 may record that the starting altitude of hiker 102 is $a_1$. Biometric parameter detector 304 may begin to record the pulse of hiker 102, and parameter detector 306 may begin to record the hiking time and hiking speed of hiker 102. Positioning component 302, altimeter 308, biometric parameter detector 304 and parameter detector 306 may record the various parameters for the duration of the hike of hiker 102.

In addition, pod 202 may employ the dead reckoning technique during the hike, wherein the final location of hiker 102 may be accurately determined from the starting location, the starting altitude, the monitored hiking speed, the monitored hiking time and monitored direction.

Throughout the hike, hiker 102 travels over path 106 which includes many different types of terrain, requiring hiker 102 to travel at various speeds. For example, the terrain between position $p_1$ and position $p_2$ may be very slippery, so hiker 106 moves slowly and cautiously. The terrain between position $p_2$ and position $p_3$ may be dry and flat, so hiker 106 may move quickly. The terrain between position $p_3$ and position $p_4$ may include an extreme change in altitude, so hiker 102 may expend a lot of energy. Additionally, hiker 102 may become hungry and stop to rest and eat lunch when he is at position $p_3$.

Returning to FIG. 5, after the parameter is detected (S504), parameter data is generated (S506).

Referring back to FIG. 3, while hiker 102 is on his hike, positioning component 302 generates data associated with the geodetic location of hiker 102 during the hike. Biometric parameter detector 304 generates data associated with the pulse rate of hiker 102 during the hike. Parameter detector 306 generates data associated with the speed of hiker 102 and the overall time elapsed during the hike, and altimeter 308 generates data associated with the altitude of hiker 102 during the hike.

The data generated by positioning component 302, biometric parameter detector 304, parameter detector 306 and altimeter 308 is sent to communication component 310. Communication component 310 provides the parameter data to processor module 312 to generate additional parameter data based on the parameter data provided by positioning component 302, biometric parameter detector 304, parameter detector 306 and altimeter 308. As a non-limiting example, step count processor 314 may determine the number of steps taken by hiker 102 based on a combination of parameter data provided by positioning component 302, biometric parameter detector 304 and parameter detector 306. Running time processor 316 may determine the amount of time hiker 102 was running during his hike based on a combination of parameter data provided by positioning component 302, parameter detector 306 and biometric parameter detector 304. Walking time processor 318 may determine the amount of time hiker 102 was walking during his hike based on a combination of parameter data provided by positioning component 302, parameter detector 306 and biometric parameter detector 304. Resting time processor 320 may determine the amount of time hiker 102 was resting during his hike based on a combination of parameter data provided by positioning component 302, biometric parameter detector 304 and parameter detector 306. Activity zone processor 322 may determine how active hiker 102 was during his hike based on a combination of parameter data generated by running time processor 316, walking time processor 318 and resting time processor 320.

The additional parameter data generated by step count processor 314, running time processor 316, walking time processor 318, resting time processor 320 and activity zone processor 322 are provided to communication component 310.

In another embodiment, if pod 202 employed the dead reckoning technique, the location determined by the starting position, monitored hiking speed, monitored hiking time, starting altitude, and monitored direction is sent to communication component 310. Returning to FIG. 5, after the parameter data is generated (S506), a handshake is completed (S508).

Referring back to FIG. 2, after hiker 102 completes the hike, he may be interested in viewing his level of activity during the hike. To view his activity levels, hiker 102 must pair shoe 108 with mobile device 204 by initiating a handshake between the two devices. A successful handshake between shoe 108 and mobile device 204 will assure an open communication channel can be established before attempting to send any data over the communication channel. The handshake between shoe 108 and mobile device 204 may occur via any known method of handshaking that effectively opens communication between two devices. Non-limiting examples of methods of handshaking include those performed via Wi-Fi, Bluetooth, a cellular network signal or any combination thereof.

As described above, the handshake may occur after the hike is complete, however in other embodiments the handshake may occur before the hike commences, or even during the hike. Additionally, in other embodiments there may be multiple handshakes. For example, one handshake may establish communication between shoe 108 and mobile device 204, while subsequent handshakes may occur when data is transmitted from shoe 108 to mobile device 204.

Returning to FIG. 5, after the handshake is completed (S508), parameter data is transmitted (S510).

Referring back to FIGS. 2 and 3, communication component 310 transmits the parameter data generated by activity pod 202 to mobile device 204. In one embodiment, data transmission may occur automatically after a successful handshake between shoe 108 and mobile device 204. In another embodiment, data transmission may only occur after hiker 102 opens an application on mobile device 204 and instructs the application to communicate with pod 202 and prepare to receive the parameter data.

Returning to FIG. 5, after the parameter data is transmitted (S510), parameter data is received (S512).

Referring back to FIG. 2, mobile device 204 receives the parameter data provided by activity pod 202.

Returning to FIG. 5, after the parameter data is received (S512), the parameter data is displayed (S514).

Referring back to FIG. 2, the application on mobile device 204 notifies hiker 102 that the parameter data has been received and is ready to display. Hiker 102 then selects the data he wishes to view. For example, hiker 102 may choose to view the amount of time he spent running, walking and resting during the hike. Hiker 102 may also choose to view his average speed, maximum speed, acceleration and total distance traveled during the hike. Hiker 102 may also choose to view how his altitude changed over time during the hike. Whatever parameters hiker 102 chooses to view, they may be displayed on the screen of mobile device 204. Hiker 102 can then determine if he is satisfied with his workout or if he wishes to perform more activities.

Returning to FIG. 5, after the parameter data is displayed (S514), method 500 ends (S516).

In the embodiment described above, the activity pod is located in one shoe, but in other embodiments each shoe may include its own activity pod. In such other embodiments, each shoe may detect its own data and send the data to a data hub such that a hiker may determine if one leg or foot does more work than the other. In other embodiments, one shoe may include a master activity pod that receives information from the activity pod in the other shoe and compile all the data, then send the data to the data hub for further processing.

In summary, traditional navigation techniques used during hiking, such as dead reckoning, present problems because it is difficult for a hiker to maintain a constant speed in a straight line while traversing rugged terrain. In addition, as hiking becomes more mainstream as a fitness activity, hikers desire to track their activity during a hike.

The invention presents hiking footwear that includes an activity tracking pod in the sole. The activity tracking pod tracks data related to a hiker's activity including, but not limited to, geodetic location, hiking speed, distance traveled, altitude, hiking time, foot force, heart rate, blood pressure, and perspiration. The activity pod can then provide the hiking data to a device on which the hiker can view data related to hike, or compare data to previous hikes. The hiker can also view his location to aid in navigation.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system comprising:
   a shoe;
   a pod disposed in the shoe, the pod comprising a positioning component, an altimeter component, and a position parameter detector in communication with a processor, the processor configured to:
      generate shoe distance data based on a first geodetic location of the positioning component at a first time and a second geodetic location of the positioning component at a second time;
      determine a first elevation of the altimeter at the first time and a second elevation of the altimeter at the second time;
      based on the shoe distance data and the first and second elevation, determine a total distance traveled by a wearer of the shoe based on signals from the position parameter detector;
      determine a number of steps taken by the wearer of the shoe; and
      generate activity zone data based on a determined amount of time the wearer of the shoe spent running, a determined amount of time the wearer of the shoe spent walking, and a determined amount of time the wearer of the shoe spent resting;
      wherein the number of steps taken by the wearer of the shoe, the amount of time the wearer of the shoe spent running, the amount of time the wearer of the shoe spent walking, and the amount of time the wearer of the shoe spent resting are determined based at least in part on the number of steps taking by the wearer of the shoe.

2. The system of claim 1, wherein the pod further comprises a communication component in communication with the processor and operable to wirelessly transmit to a remote device for display thereat at least one of: the first geodetic location, the second geodetic location, the shoe distance data, the first elevation, the second elevation, the number of steps taken, the activity zone data, the amount of time the wearer of the shoe spent running, the amount of time the wearer of the shoe spent walking, and the amount of time the wearer of the shoe spent resting.

3. The system of claim 1, wherein the position parameter detector is configured to detect a position parameter of the wearer of the shoe, the position parameter comprising one of: a velocity parameter, an acceleration parameter, and/or a change in acceleration parameter; and
   wherein the processor is further configured to: determine the second geodetic location based at least in part on the first geodetic location and the detected position parameter.

4. The system of claim 1, wherein the activity zone data comprises an amount of time the wearer of the shoe has spent in one or more predetermined activity level ranges.

5. A non-transitory, tangible, computer-readable media having computer-readable instructions stored thereon and for use with a pod disposed at a shoe, the instructions configured to cause the pod to:
   determine a total distance traveled by a wearer of the shoe based on (i) a distance derived from a determined first geodetic location of a positioning component associated to the pod of the shoe at a first time and a determined second geodetic location of the positioning component associated to the pod of the shoe at a second time; and (ii) a first elevation of an altimeter component associated to the pod of the shoe at the first time and a second elevation of the altimeter component associated to the pod of the shoe at the second time;
   generate activity zone data based on a determined amount of time the wearer of the shoe spent running, a determined amount of time the wearer of the shoe spent walking, and a determined amount of time the wearer of the shoe spent resting; and
   transmit the total distance and activity zone data wirelessly to a remote device for display thereat.

6. The computer-readable media of claim 5, wherein the amount of time the wearer of the shoe spent running, the amount of time the wearer of the shoe spent walking, and the amount of time the wearer of the shoe spent resting are determined based at least in part on a determination of a number of steps taken by the wearer of the shoe.

7. The computer-readable media of claim 6, wherein the first and second elevation of the shoe is determined via an altimeter associated to the pod; and wherein the number of steps taken by the wearer of the shoe is determined via an accelerometer associated to the pod.

8. The computer-readable media of claim 5, wherein at least one of the first and second geodetic locations is determined via the position detecting component in communication with the pod.

9. The computer-readable media of claim 8, wherein the first geodetic location is determined via the position detecting component and the second geodetic location is determined based on the first geodetic location and one or more of: speed and/or direction of the wearer of the shoe from the first time to the second time.

10. The computer-readable media of claim 5, wherein the activity zone data comprises an amount of time the wearer of the shoe has spent in one or more predetermined activity level ranges.

11. A method for monitoring activity of a wearer of a shoe having a pod disposed therein, the method comprising:
   determining a first geodetic location of a positioning component associated to the pod of the shoe at a first time;
   determining a second geodetic location of the positioning component associated to the pod of the shoe at a second time;
   calculating shoe distance data based on the first and second geodetic locations;
   determining a first elevation of an altimeter apparatus associated to the pod of the shoe at the first time;
   determining a second elevation of the altimeter apparatus associated to the pod of the shoe at the second time;
   calculating a total distance traveled by a wearer of the shoe based on the shoe distance data and the first and second elevation;
   determining an amount of time the wearer of the shoe spent running;
   determining an amount of time the wearer of the shoe spent walking;
   determining an amount of time the wearer of the shoe spent resting; and
   calculating activity zone data based on the amount of time the wearer of the shoe spent running, the amount of time the wearer of the shoe spent walking, and the amount of time the wearer of the shoe spent resting.

12. The method of claim 11, wherein the first geodetic location is determined via at least one of: global positioning enabled communication device, a Wi-Fi enabled communication device, a Bluetooth enabled communication device, a cellular network enabled communication device, and/or a near field communication device.

13. The method of claim 11, wherein the second geodetic location is determined:
   via at least one of: global positioning enabled communication device, a Wi-Fi enabled communication device, a Bluetooth enabled communication device, a cellular network enabled communication device, and/or a near field communication device; or
   by a dead reckoning technique using the first geodetic location and one or more of: speed and/or direction of the wearer of the shoe.

14. The method of claim 11, further comprising determining a number of steps taken by the wearer of the shoe between the first and second times via an accelerometer associated to the pod disposed in the shoe.

15. The method of claim 14, wherein the amount of time the wearer of the shoe spent running, the amount of time the wearer of the shoe spent walking, and the amount of time the wearer of the shoe spent resting are determined based at least in part on the number of steps taken by the wearer of the shoe between the first and second times.

16. The method of claim 11, wherein the activity zone data comprises an amount of time the wearer of the shoe has spent in one or more predetermined activity level ranges.

17. The method of claim 11, further comprising providing total distance traveled and/or the activity zone data for display at a remote device.

* * * * *